United States Patent
Zhang et al.

(10) Patent No.: US 12,355,027 B2
(45) Date of Patent: *Jul. 8, 2025

(54) WINDING SHAFT, CELL MANUFACTURING APPARATUS, AND CELL MANUFACTURING METHOD

(71) Applicant: JIANGSU CONTEMPORARY AMPEREX TECHNOLOGY LIMITED, Changzhou (CN)

(72) Inventors: Xiaowei Zhang, Changzhou (CN); Jiang Lin, Changzhou (CN); Minghao Tang, Changzhou (CN); Wenfa Lin, Changzhou (CN); Zhenqiang Cui, Changzhou (CN); Shengwu Zhang, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,329

(22) Filed: Apr. 24, 2024

(65) Prior Publication Data

US 2024/0274858 A1 Aug. 15, 2024

Related U.S. Application Data

(63) Continuation of application No. 18/353,896, filed on Jul. 18, 2023, now Pat. No. 12,002,919, which is a (Continued)

(30) Foreign Application Priority Data

Jul. 16, 2021 (CN) .......................... 202110803567.2

(51) Int. Cl.
*B65H 75/24* (2006.01)
*H01M 10/04* (2006.01)

(52) U.S. Cl.
CPC .... *H01M 10/0409* (2013.01); *B65H 75/2484* (2021.05); *H01M 10/0431* (2013.01); *B65H 2511/212* (2013.01); *B65H 2511/416* (2013.01)

(58) Field of Classification Search
CPC .... B65H 75/24; B65H 75/242; B65H 75/248; B65H 75/2484; H01M 10/0409
See application file for complete search history.

(56) References Cited

U.S. PATENT DOCUMENTS

| 3,645,465 A | 2/1972 | Peery |
| 4,492,346 A | 1/1985 | Young |

(Continued)

FOREIGN PATENT DOCUMENTS

| CN | 106532135 A | 3/2017 |
| CN | 106876796 A | 6/2017 |

(Continued)

OTHER PUBLICATIONS

International Search Report received in the corresponding International Application PCT/CN2022/097643, mailed Sep. 1, 2022.

(Continued)

*Primary Examiner* — Sang K Kim
(74) *Attorney, Agent, or Firm* — K&L Gates LLP

(57) ABSTRACT

Provided are a winding shaft, a cell manufacturing apparatus, and a cell manufacturing method. The winding shaft is used for winding plates and includes: a winding shaft body including a first winding surface; an adjustment member configured to be mounted to the winding shaft body and movable simultaneously in an axial direction of the winding shaft and in a radial direction of the winding shaft, where the adjustment member includes a second winding surface, and the first winding surface and the second winding surface are configured to wind the plates jointly; and an actuator configured to drive the adjustment member to move to change (Continued)

a relative position of the second winding surface with respect to the first winding surface, so as to change a winding circumference of the winding shaft. The winding shaft of the present application can reduce the possibility of or the amount of misalignment between the tabs.

14 Claims, 10 Drawing Sheets

Related U.S. Application Data continuation of application No. PCT/CN2022/097643, filed on Jun. 8, 2022.

(56) References Cited

U.S. PATENT DOCUMENTS

| | | | | |
|---|---|---|---|---|
| 10,829,339 | B2* | 11/2020 | Lee | B65H 18/04 |
| 12,002,919 | B2* | 6/2024 | Zhang | H01M 10/0431 |
| 2011/0297780 | A1 | 12/2011 | Feng | |
| 2017/0133704 | A1 | 5/2017 | Kim et al. | |
| 2017/0233209 | A1* | 8/2017 | Perini | B65H 75/248 |
| | | | | 242/571.8 |
| 2019/0292004 | A1 | 9/2019 | Lee et al. | |

FOREIGN PATENT DOCUMENTS

| | | |
|---|---|---|
| CN | 107293807 A | 10/2017 |
| CN | 108987821 A | 12/2018 |
| CN | 109524704 A | 3/2019 |
| CN | 109585902 A | 4/2019 |
| CN | 110474091 A | 11/2019 |
| CN | 110718718 A | 1/2020 |
| CN | 111584923 A | 8/2020 |
| CN | 111653801 A | 9/2020 |
| CN | 112310568 A | 2/2021 |
| CN | 112701340 A | 4/2021 |
| CN | 112736296 A | 4/2021 |
| CN | 113224367 A | 8/2021 |
| CN | 113270630 A | 8/2021 |
| CN | 113300057 A | 8/2021 |
| JP | 2016051654 A | 4/2016 |
| JP | 2017062919 A | 3/2017 |

OTHER PUBLICATIONS

Written Opinion received in the corresponding International Application PCT/CN2022/097643, mailed Sep. 1, 2022.
First Office Action received in the corresponding Chinese Application 202110803567.2, mailed Aug. 25, 2021.
The extended European search report received in the corresponding European Application 22841089.0, mailed Apr. 17, 2024.
The Non-Final Office Action received in the corresponding U.S. Appl. No. 18/353,896, mailed Oct. 4, 2023.

* cited by examiner

Provide a winding shaft, where the winding shaft includes a winding shaft body, an adjustment member and an actuator, the winding shaft body includes a first winding surface, the adjustment member is configured to be mounted on the winding shaft body and movable simultaneously in an axial direction of the winding shaft and a radial direction of the winding shaft, the adjustment member includes a second winding surface, the first winding surface and the second winding surface are configured to wind plates jointly, and the plates include tab; and obtain a magnitude of misalignment between adjacent tabs of i tabs wound around the winding shaft, where i≥2

↓

Sift a maximum value from the magnitudes of misalignment, and compute a winding circumference adjustment amount of the winding shaft according to the maximum value

↓

Drive the adjustment member to move by means of the actuator according to the winding circumference adjustment amount to change a relative position of the second winding surface with respect to the first winding surface, so as to adjust a winding circumference of the winding shaft

FIG. 12

Provide a winding shaft, where the winding shaft includes a winding shaft body, an adjustment member and an actuator, the winding shaft body includes a first winding surface, the adjustment member is configured to be mounted on the winding shaft body and movable simultaneously in an axial direction of the winding shaft and a radial direction of the winding shaft, the adjustment member includes a second winding surface, the first winding surface and the second winding surface are configured to wind plates jointly, and the plates include tabs; and obtain a magnitude of misalignment between adjacent tabs in an nth cell wound around the winding shaft, where $n \geq 1$

↓

Sift a maximum value from the magnitudes of misalignment

↓

Compute a winding circumference adjustment amount of the winding shaft according to the maximum value

↓

Drive the adjustment member to move by means of the actuator according to the winding circumference adjustment amount to change a relative position of the second winding surface with respect to the first winding surface, so as to adjust a winding circumference by which the winding shaft winds an $(n+1)^{th}$ cell

FIG. 13

WINDING SHAFT, CELL MANUFACTURING APPARATUS, AND CELL MANUFACTURING METHOD

CROSS-REFERENCE TO RELATED APPLICATIONS

The present application is a continuation of U.S. application Ser. No. 18/353,896, filed on Jul. 18, 2023, which is a continuation of International Application PCT/CN2022/097643, filed Jun. 8, 2022, which claims the priority of Chinese patent application No. 202110803567.2, filed on Jul. 16, 2021 and entitled "Winding Shaft, Cell Manufacturing Apparatus, and Cell Manufacturing Method", which is incorporated in its entirety herein by reference.

TECHNICAL FIELD

The present application relates to the technical field of batteries, in particular to a winding shaft, a cell manufacturing apparatus, and a cell manufacturing method.

BACKGROUND ART

In a traction battery production process, plates and a separator need to be wound into a cell by using a winding apparatus. The wound and pre-press set cell is of a flat structure. However, there is a misalignment of the tabs of the plates during winding, resulting in positional interference of the tabs with other structural members after the moulded cell is loaded into the housing.

SUMMARY OF THE INVENTION

The present application provides a winding shaft, a cell manufacturing apparatus, and a cell manufacturing method, so as to reduce the possibility of or the magnitude of misalignment between the tabs.

In an aspect, the present application provides a winding shaft, used for winding plates and including:
  a winding shaft body including a first winding surface;
  an adjustment member configured to be mounted to the winding shaft body and movable simultaneously in an axial direction of the winding shaft and in a radial direction of the winding shaft, where the adjustment member includes a second winding surface, and the first winding surface and the second winding surface are configured to wind the plates jointly; and
  an actuator configured to drive the adjustment member to move to change a relative position of the second winding surface with respect to the first winding surface, so as to change a winding circumference of the winding shaft.

In another aspect, the present application provides a cell manufacturing apparatus, including:
  the winding shaft according to the above embodiment; and
  a driving device configured to drive the adjustment member by means of the actuator, to move the adjustment member simultaneously in the axial direction of the winding shaft and the radial direction of the winding shaft.

In yet another aspect, the present application provides a cell manufacturing method, including:
  providing a winding shaft, where the winding shaft includes a winding shaft body, an adjustment member and an actuator, the winding shaft body includes a first winding surface, the adjustment member is configured to be mounted on the winding shaft body and movable simultaneously in an axial direction of the winding shaft and in a radial direction of the winding shaft, the adjustment member includes a second winding surface, the first winding surface and the second winding surface are configured to wind plates jointly, and the plates include tabs; and obtaining a magnitude of misalignment between adjacent tabs of i tabs wound around the winding shaft, where $i \geq 2$;
  sifting a maximum value from the magnitudes of misalignment, and computing a winding circumference adjustment amount of the winding shaft according to the maximum value; and
  driving the adjustment member to move by means of the actuator according to the winding circumference adjustment amount, to change a relative position of the second winding surface with respect to the first winding surface, so as to adjust a winding circumference of the winding shaft.

In still another aspect, the present application provides a cell manufacturing method, including:
  providing a winding shaft, where the winding shaft includes a winding shaft body, an adjustment member and an actuator, the winding shaft body includes a first winding surface, the adjustment member is configured to be mounted on the winding shaft body and movable simultaneously in an axial direction of the winding shaft and in a radial direction of the winding shaft, the adjustment member includes a second winding surface, the first winding surface and the second winding surface are configured to wind plates jointly, and the plates include tabs; and obtaining an magnitude of misalignment between adjacent tabs in an $n^{th}$ cell wound around the winding shaft, where $n \geq 1$;
  sifting a maximum value from the magnitudes of misalignment;
  computing a winding circumference adjustment amount of the winding shaft according to the maximum value; and
  driving the adjustment member to move by means of the actuator according to the winding circumference adjustment amount, to change a relative position of the second winding surface with respect to the first winding surface, so as to adjust a winding circumference by which the winding shaft winds an $(n+1)^{th}$ cell.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

FIG. 12 is a schematic flowchart of a cell manufacturing method according to an embodiment of the present application; and FIG. 13 is a schematic flowchart of a cell manufacturing method according to another embodiment of the present application.

Figure 1:
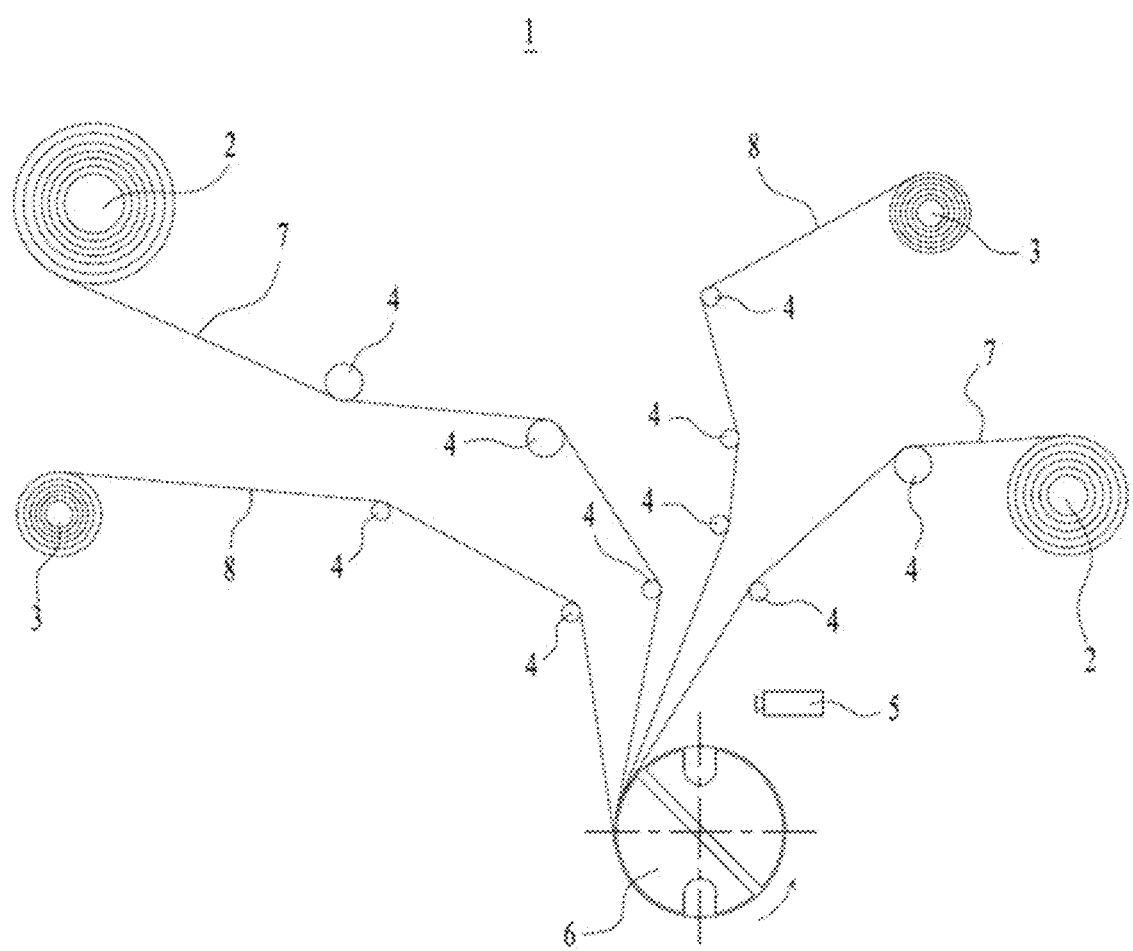
FIG. 1 is a schematic structural diagram of a cell manufacturing apparatus according to an embodiment of the present application.

In the accompanying drawings, the figures are not drawn to scale.

LIST OF REFERENCE NUMERALS 1. cell manufacturing apparatus; 2. first unwinding device; 3. second unwinding device; 4. tension adjustment roller; 5. image recognition device;
6. winding shaft; 6a. winding area; 61. winding shaft body; 61a. first winding surface; 61b. accommodating portion; 61c. inclined surface; 611. first half shaft; 612. second half shaft;
62. adjustment member; 62a. second winding surface; 621. first end; 622. second end; 63. actuator; 64. elastic member; 65. guide rail;
7. plate; 71. tab; 8. separator; 9. cell;
10. driving device; 101. base; 102. driver; 103. adapter;
20. translation device; 201. rail; 202. deployment assembly;
30. tab detection sensor;
40. winding shaft angle gauge; and
V. axial direction.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that the terms "mounting", "connecting", and "connection" should be interpreted in the broad sense unless explicitly defined and limited otherwise. For example, the terms may mean a fixed connection, a detachable connection, or an integral connection, or may mean a direct connection, or an indirect connection by means of an intermediate medium. For those of ordinary skill in the art, the specific meanings of the terms mentioned above in the present application can be construed according to specific circumstances.

In the present application, a battery monomer may include a lithium ion secondary battery, a lithium ion primary battery, a lithium-sulphur battery, a sodium-lithium ion battery, a sodium ion battery or a magnesium ion battery, etc., which will not be limited in the embodiments of the present application. The battery monomer may be flat, cuboid or other shapes, which is not limited by the embodiments of the present application. The battery monomers are generally classified into three types depending on the way of package: cylindrical battery monomers, square battery monomers and pouch battery monomers, which is not limited in the embodiments of the present application.

A battery mentioned in the embodiments of the present application refers to a single physical module comprising one or more battery monomers to provide a high voltage and capacity. For example, the battery mentioned in the present application may include a battery module, a battery pack, etc. The battery generally comprises a case for packaging one or more battery monomers. The case can prevent liquid or other foreign matters from affecting charging or discharging of a battery monomer.

The battery monomer includes a cell and an electrolyte solution, where the cell consists of a positive plate, a negative plate and a separator. The operation of the battery monomer mainly relies on the movement of metal ions between the positive electrode plate and the negative electrode plate. The positive plate includes a positive current collector and a positive active material layer, the positive active material layer coating a surface of the positive current collector, a current collector not coated with the positive active material layer protrudes out of the current collector coated with the positive active material layer, and the current collector not coated with the positive active material layer serves as a positive tab after laminated. Taking a lithium-ion battery as an example, the material of the positive electrode current collector may be aluminium, and the positive electrode active material may be lithium cobalt oxides, lithium iron phosphate, ternary lithium or lithium manganate, etc. The negative plate includes a negative current collector and a negative active material layer, the negative active material layer coating a surface of the negative current collector, a current collector not coated with the negative active material layer protrudes out of the current collector coated with the negative active material layer, and the current collector not coated with the negative active material layer serves as a negative tab after laminated. The negative current collector may be made of copper, and the negative electrode active material may be carbon, silicon, etc. The separator may be made of PP or PE, etc. Further, the cell may be of a wound structure.

Design factors on many aspects need to be simultaneously considered for the development of the battery technology, such as energy density, cycling life, discharge capacity, charge-discharge rate, and other performance parameters. In addition, the safety of the battery needs to be taken into account.

Having discovered misalignment of tabs of plates of a cell, the applicant has analysed and investigated a structure and machining of a battery monomer. The applicant has found that during winding of the cell of the battery monomer, the plates have fluctuations in thickness or winding tension, which are prone to tab misalignment. The applicant attempted to adjust positions of the tabs by adjusting the thickness of the plates, however since the thickness of the plates is mainly influenced by coating, a cold pressing process and bounce, the manner of adjusting the thickness of the plate by rolling the plate by a bump roll in a subsequent winding process easily results in plate powder dropping, thereby influencing the cell performance. The applicant has also attempted to adjust the positions of the tabs by adjusting the tension of the plates, that is, adjusting the positions of the tabs by adjusting the tightness of the plates. During adjustment, substantial tension adjustment of the plates is required in order to make slight adjustment to the positions of the tabs. However, the substantial tension adjustment may cause problems such as wrinkling of the plates due to unstable tension of the wound cell, which influences cell performance and safety during use. The applicant has also attempted to adjust the positions of the tabs by adjusting tab cut pitches on the plates. However, since a die cutting process of the tabs and the winding process of the plates are different processes, closed loop control may not be formed, such that the tab position adjustment is limited and inefficient by adjusting the tab cut pitch.

In view of the above problems discovered by the applicant, the applicant has made improvements to the structure of a cell manufacturing apparatus, and embodiments of the present application are further described below.

For a better understanding of the present application, embodiments of the present application are described below in conjunction with FIGS. 1-11.

Figure 2:
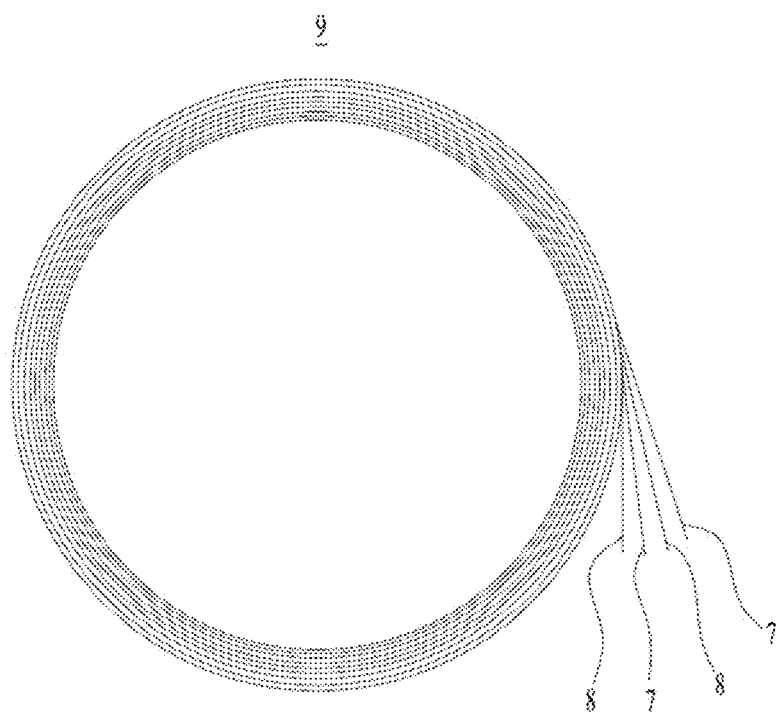
FIG. 2 is a schematic structural diagram of a cell according to an embodiment of the present application.

With reference to FIGS. 1 and 2, a cell manufacturing apparatus 1 according to an embodiment of the present application includes first unwinding devices 2, second unwinding devices 3, tension adjustment rollers 4, an image recognition device 5, and a winding shaft 6. The first unwinding devices 2 are configured to accommodate plates 7 in the form of rolls. The second unwinding devices 3 are configured to accommodate separators 8 in the form of rolls. The plates 7 released by the first unwinding devices 2 and the separators 8 released by the second unwinding devices 3 may pass through the tension adjustment rollers 4 separately. The tension adjustment rollers 4 are configured to adjust tension of the plates 7 and/or the separators 8. The tension adjustment rollers 4 may maintain the plates 7 and the separators 8 in tension, so as to reduce the possibility of wrinkling of the plates 7 or the separators 8 caused by the fact that the plates 7 or the separators 8 enter the winding shaft 6 in a loosened state. The plates 7 and the separators 8 passing through the tension adjustment rollers 4 enter the winding shaft 6 to be wound by the winding shaft 6. The plate 7 and the separator 8 of the embodiment of the present application may each be plural. The plates 7 and the separators 8 are arranged alternatively. The winding shaft 6 winds a sheet formed by the plates 7 and the separators 8 which are arranged in a stacked manner into a cell 9. The image recognition device 5 may be configured to detect whether the separators 8 and the plates 7 are aligned with each other in an axial direction V of the winding shaft 6. The image recognition device 5 may be an industrial camera.

Figure 3:
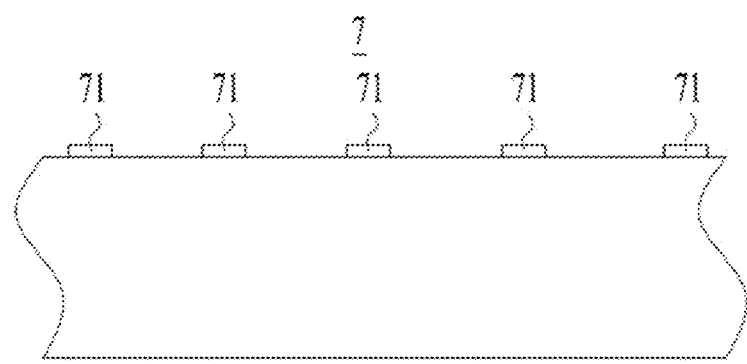
FIG. 3 is a schematic diagram of a partial structure of a plate according to an embodiment of the present application.
Figure 4:
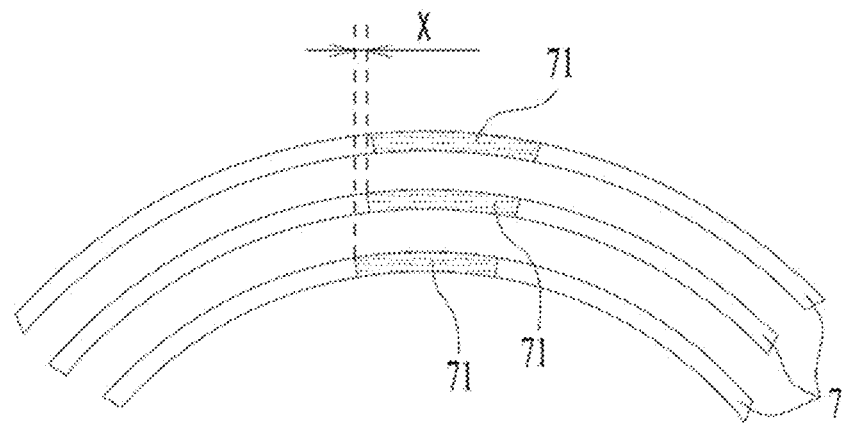
FIG. 4 is a schematic diagram of a partial structure of a plate in a wound state according to an embodiment of the present application.

With reference to FIG. 3, the plate 7 includes a plurality of tabs 71. In an unwound state of the plate 7, that is, a spread state, the plurality of tabs 71 are separated from each other in a length direction of the plate 7. With reference to FIG. 4, the positions of two adjacent tabs 71 are misaligned when the plate 7 is in a wound state, resulting in a radial misalignment of the two adjacent tabs 71 along the winding shaft 6. The radial direction of the winding shaft 6 is perpendicular to the axial direction V, that is, perpendicular to an axis of rotation of the winding shaft 6.

Figure 5:
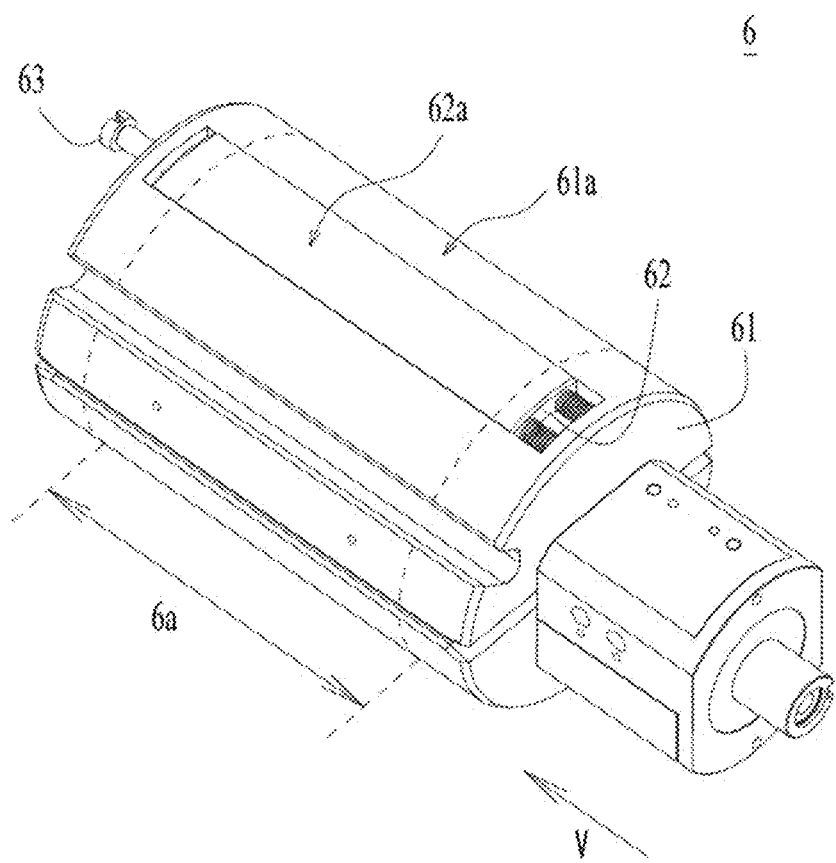
FIG. 5 is a schematic structural diagram of a winding shaft according to an embodiment of the present application.

With reference to FIG. 5, the winding shaft 6 according to an embodiment of the present application includes a winding area 6a. This winding area 6a is an area having a preset width in the axial direction V of the winding shaft 6 itself. The winding shaft 6 winds the plates 7 and the separators 8 over the winding area 6a. The plates 7 and the separators 8 complete winding at the winding area 6a.

In some embodiments, a computation method for the magnitude of misalignment between tabs 71 is: A position of a first tab 71 in an actual wound cell 9 coincides in default with a standard position of a first tab 71 in a standard cell. An actual rotation angle P1 of the winding shaft 6 when an $i^{th}$ tab 71 in the actual wound cell 9 is to enter the winding shaft 6 is obtained, and a standard rotation angle P0 of the winding shaft 6 when an $i^{th}$ tab 71 in the standard cell is to enter the winding shaft 6 is obtained. When the $i^{th}$ tab 71 in the actual wound cell 9 is to enter the winding shaft 6, an outer perimeter of a sheet wound around the winding shaft 6 is Ci, and the magnitude of misalignment Xi of the $i^{th}$ tab 71 is computed: Xi=(P1−P0) Ci/360, where i≥2. It is to be noted that the actual rotation angle P1 of the winding shaft 6 is continuously accumulated, that is, the actual rotation angle P1 is a product of 360° and the total number of turns of the winding shaft 6 when the $i^{th}$ tab 71 enters the winding shaft 6.

Illustratively, an actual rotation angle P1 of the winding shaft 6 when the first tab 71 in the actual wound cell 9 is to enter the winding shaft 6 is 0°, and an actual rotation angle P1 of the winding shaft 6 when the second tab 71 in the actual wound cell 9 is to enter the winding shaft 6 is 360°. Moreover, a standard rotation angle P0 of the winding shaft 6 when the first tab 71 of the standard cell is to enter the winding shaft 6 is 0°, and a standard rotation angle P0 of the winding shaft 6 when the second tab 71 of the standard cell is to enter the winding shaft 6 is 360°, such that the first tab 71 and the second tab 71 of the actual wound cell 9 are aligned with each other without misalignment.

An actual rotation angle P1 of the winding shaft 6 when the first tab 71 in the actual wound cell 9 is to enter the winding shaft 6 is 0°, and an actual rotation angle P1 of the winding shaft 6 when the second tab 71 in the actual wound cell 9 is to enter the winding shaft 6 is 366°. Moreover, a standard rotation angle P0 of the winding shaft 6 when the first tab 71 of the standard cell is to enter the winding shaft 6 is 0°, and a standard rotation angle P0 of the winding shaft 6 when the second tab 71 of the standard cell is to enter the winding shaft 6 is 360°, such that the first tab 71 and the second tab 71 of the actual wound cell 9 are misaligned with each other.

An embodiment of the present application provides a winding shaft 6. The winding shaft 6 includes a winding shaft body 61 and an adjustment member 62. The adjustment member 62 is configured to be mounted on the winding shaft body 61 and movable simultaneously in an axial direction V of the winding shaft 6 and in a radial direction of the winding shaft 6, so as to change the winding circumference of the winding shaft 6.

It is to be noted that the winding circumference of the winding shaft 6 means that when the winding shaft 6 rotates by one turn, the winding shaft 6 may wind a preset length of the plate 7, and the winding circumference is equal to the preset length. Alternatively, from the perspective of measurement, a value measured by one turn around the winding shaft 6 by using a tape is the wound circumference of the winding shaft 6. After the winding circumference of the winding shaft 6 is changed, the length of the plate 7 that the winding shaft 6 may wind correspondingly changes when the winding shaft 6 rotates by one turn.

In the embodiment of the present application, the adjustment member 62 is movably connected to the winding shaft body 61. The adjustment member 62 and the winding shaft body 61 may rotate together about the axis of rotation of the winding shaft 6, to co-operate with the sheet formed by stacking the wound plates 7 and the separators 8. The sheet is wound around an outwardly facing surface of each of the winding shaft body 61 and the adjustment member 62 to form a cylindrical wound cell 9. The sheet makes direct contact with the outwardly facing surface of the adjustment member 62. The axial direction V of the winding shaft 6 extends in the same direction as the axis of rotation of the winding shaft 6.

According to the winding shaft 6 of embodiments of the present application, the winding circumference of the winding shaft 6 may be adjusted by adjusting the relative position of the adjustment member 62 with respect to the winding shaft body 61. After the winding circumference of the winding shaft 6 is changed, a preset length of a plate 7 wound around the winding shaft 6 may be changed, such that positions of tabs 71 on the plates 7 wound around the winding shaft 6 may be adjusted, which is conducive to reduction in possibility of misalignment between the tabs 71 or reduction in the magnitude of misalignment between the tabs 71, and then reduces the possibility of positional interference of the tabs 71 with other structural members after the wound moulded cell 9 is loaded into a housing, so as to improve safety of a battery monomer.

In some embodiments, the winding shaft 6 may change the winding circumference during a winding process. Under the condition that an actual rotation angle P1 of the winding shaft 6 when the first tab 71 in the actual wound cell 9 is to enter the winding shaft 6 is 0° and an actual rotation angle P1 of the winding shaft 6 when the second tab 71 in the actual wound cell 9 is to enter the winding shaft 6 is 366°, and moreover, a standard rotation angle P0 of the winding shaft 6 when the first tab 71 of the standard cell is to enter the winding shaft 6 is 0° and a standard rotation angle P0 of the winding shaft 6 when the second tab 71 of the standard cell is to enter the winding shaft 6 is 360°, the second tab 71 in the actual wound cell 9 has a lag to enter the winding shaft 6. Under the condition that the winding circumference of the winding shaft 6 is not changed, the first tab 71 and the second tab 71 in the actual wound cell 9 may be misaligned with each other. Under the condition that the winding circumference of the winding shaft 6 is increased by moving the adjustment member 62, the lagged entry of the second tab 71 may be ameliorated when the winding shaft 6 rotates by the same angle, such that the second tab 71 and the first tab 71 are aligned or the magnitude of misalignment between the second tab 71 and the first tab 71 is reduced. It may be understood that under the condition that the second tab 71 enter the winding shaft 6 in advance, the winding circumference of the winding shaft 6 may be reduced by moving the adjustment member 62, then the advanced entry of the second tab 71 may be ameliorated when the winding shaft 6 rotates by the same angle, such that the second tab 71 and the first tab 71 are aligned or the magnitude of misalignment between the second tab 71 and the first tab 71 is reduced. The above embodiments are merely to illustrate the technical solutions of the present application, and do not limit the scope of protection of the present application.

In some examples, the winding circumference adjustment amount $\Delta L$ is: $\Delta L = KX/Z$, where X is a maximum value of the magnitudes of misalignment between adjacent tabs 71 of the i tabs 71 wound around the winding shaft 6, Z is the number of turns of a sheet wound around the winding shaft 6, K is a tab 71 misalignment adjustment factor, and $0.2 < K < 1$.

In some embodiments, the winding shaft 6 may change the winding circumference after winding one cell 9, and then winds the next cell 9, so as to reduce the possibility of misalignment between the tabs 71 of or reduce the magnitude of misalignment between the tabs 71 of the next cell 9. Under the condition that the last cell 9 has misalignment of tabs 71, the winding circumference of the winding shaft 6 may be increased or decreased after winding the last cell 9. The next cell 9 is then wound by using the winding shaft 6 with completed adjustment, so as to align the tabs 71 of the next cell 9 or to reduce the magnitude of misalignment between the tabs 71.

In some examples, the winding circumference adjustment amount $\Delta L$ is: $\Delta L = KX/Z$, where X is the maximum value of the magnitudes of misalignment between adjacent tabs 71 in the $n^{th}$ cell 9 wound around the winding shaft 6, Z is the number of turns of a sheet wound around the winding shaft 6, K is a tab 71 misalignment adjustment factor, $n \geq 1$, and $0.2 < K < 1$.

In some embodiments, the winding shaft body 61 is entirely cylindrical. A cross-sectional shape of the winding shaft 6 may be a circle, an ellipse, a regular polygon or a diamond, and the wound cell 9 is of a cylindrical shape, an elliptical cylindrical shape, a regular polygonal cylindrical shape or diamond cylindrical shape respectively.

Figure 6:
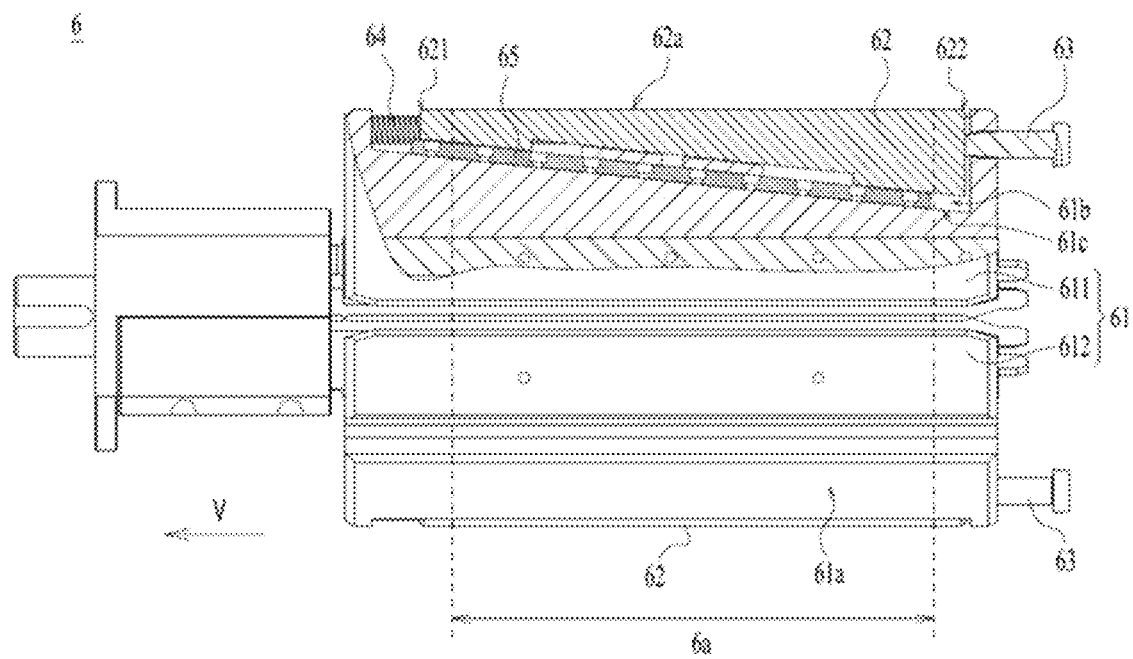
FIG. 6 is a schematic diagram of a partially sectional structure of the winding shaft according to the embodiment as shown in FIG. 5.

In some embodiments, with reference to FIGS. 5 and 6, the adjustment member 62 is configured to move simultaneously in the axial direction V and the radial direction of the winding shaft 6, so as to change the winding circumference of the winding shaft 6.

Under the condition that the sheet formed by the plates 7 and the separators 8 is wound around the winding shaft 6, when the adjustment member 62 moves only in the radial direction to increase the winding circumference of the winding shaft 6, the plates 7 are only subjected to an acting force in the circumferential direction of the winding shaft 6, such that different areas of active material layers applied to the plates 7 are prone to mismovement to cause chipping and powder dropping under the acting force.

The adjustment member 62 of the embodiment of the present application moves simultaneously in the axial direction V and the radial direction, such that the plates 7 are subjected to the acting force in the circumferential direction of the winding shaft 6 and the acting force in the axial direction V of the winding shaft 6. The acting force in the axial direction V of the winding shaft 6 may increase an internal force of the active material layers applied to the plates 7, making different areas of the active material layers themselves less prone to mismovement, so as to reduce the possibility of chipping and powder dropping.

It is to be noted that the adjustment member 62 moving simultaneously in the axial direction V and in the radial direction of the winding shaft 6 means that the adjustment member 62 may change its position synchronously in the axial direction V and in the radial direction when driven by an external force.

In some embodiments, the winding shaft body 61 includes a first winding surface 61*a*. The adjustment member 62 includes a second winding surface 62*a*. The first winding surface 61*a* and the second winding surface 62*a* are configured to wind the plates 7 jointly. The winding shaft 6 further includes an actuator 63. The actuator 63 is configured to drive the adjustment member 62 to move to change a relative position of the second winding surface 62*a* with respect to the first winding surface 61*a*, so as to change a winding circumference of the winding shaft 6.

It is to be noted that the actuator 63 may itself apply a force to the other structures to force the structures to move. In the embodiment, the actuator 63 is configured to provide a driving force for the adjustment member 62. The actuator 63 may be connected to the winding shaft body 61 or may be provided separately from the winding shaft body 61. The first winding surface 61*a* of the winding shaft body 61 is an outer surface for making contact with the sheet formed by the plates 7 and the separators 8 and may providing support for the sheet at the contact area. At least part of the first winding surface 61*a* of the winding shaft body 61 may make contact with the sheet formed by the plates 7 and the separators 8. The second winding surface 62*a* of the adjustment member 62 is an outer surface for making contact with the sheet formed by the plates 7 and the separators 8 and may providing support for the sheet at the contact area.

With no height difference between an edge of the first winding surface 61*a* of the winding shaft body 61 close to the second winding surface 62*a* and an edge of the second winding surface 62*a* of the adjustment member 62 close to the first winding surface 61*a*, the winding circumference of the winding shaft 6 has a minimum value.

The adjustment member 62 moves simultaneously in the axial direction V and the radial direction of the winding shaft 6, such that the winding circumference of the winding shaft 6 increases when the edge of the second winding surface 62*a* close to the first winding surface 61*a* protrudes outwardly of the edge of the first winding surface 61*a* close to the second winding surface 62*a*. The greater the extent to which the adjustment member 62 protrudes from the winding shaft body 61, the greater the winding circumference of the winding shaft 6.

In some embodiments, the winding shaft 6 includes one adjustment member 62. Alternatively, the winding shaft 6 includes two or more adjustment members 62. The two or more adjustment members 62 are evenly distributed in the circumference direction of the winding shaft 6. The two or more adjustment members 62 move synchronously when it is necessary to change the winding circumference of the winding shaft 6.

In some embodiments, with reference to FIG. 6, the winding shaft 6 includes a first half shaft 611 and a second half shaft 612. The first half shaft 611 and the second half shaft 612 are arranged side by side in the radial direction. The first half shaft 611 and the second half shaft 612 may move closer to or away from each other. The first half shaft 611 and the second half shaft 612 move away from each other when the winding shaft 6 needs to perform winding work. Heads of the separators 8 are placed between the first half shaft 611 and the second half shaft 612 and gripped by an additionally arranged inner grip needle (not shown in the figure). After the winding shaft 6 winds the plates 7 and the separators 8 by the preset number of turns to form a cell 9, rotation is stopped. The first half shaft 611 and the second half shaft 612 then move closer to each other, such that the winding shaft 6 is separated from the cell 9 to facilitate removal of the cell 9 from the winding shaft 6.

In some examples, at least one adjustment member 62 is arranged on the first half shaft 611 and/or at least one adjustment member 62 is arranged on the second half shaft 612.

Illustratively, with reference to FIG. 6, one adjustment member 62 is arranged on the first half shaft 611 and another adjustment member 62 is arranged on the second half shaft 612. The two adjustment members 62 are arranged symmetrically.

Figure 7:
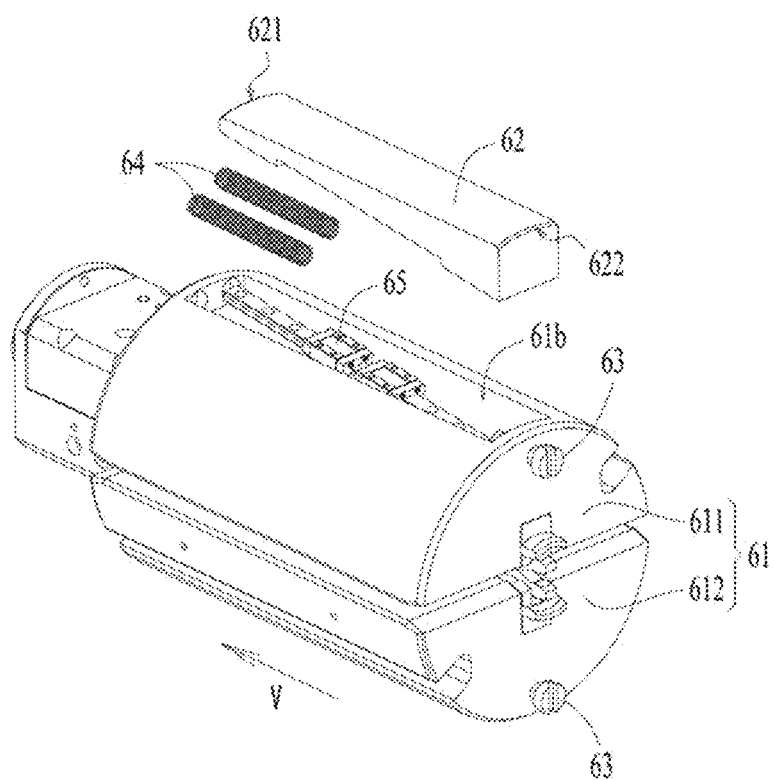
FIG. 7 is a schematic diagram of a partially exploded structure of the winding shaft according to the embodiment as shown in FIG. 5.

In some embodiments, with reference to FIGS. 6 and 7, the winding shaft body 61 includes an accommodating portion 61*b*. The accommodating portion 61*b* includes an opening located in the first winding surface 61*a*. At least part of the adjustment member 62 is arranged in the accommodating portion 61*b* through the opening. The actuator 63 is configured to drive the adjustment member 62 to extend out of or retract into the accommodating portion 61*b*.

When the adjustment member 62 is driven to extend out of the accommodating portion 61*b* by the actuator 63, the winding circumference of the winding shaft 6 may be increased. When the adjustment member 62 is driven to retract into the accommodating portion 61*b* by the actuator 63, the winding circumference of the winding shaft 6 may be decreased.

The winding shaft 6 is rotated at a high speed when performing a winding action, and due to an arrangement mode in which the adjustment member 62 is located in the accommodating portion 61*b*, the winding shaft body 61 may limit and constrain the adjustment member 62 in a circumferential direction of the winding shaft 6. On the one hand, the possibility that the adjustment member 62 is shifted in position in the circumferential direction by being subjected to a large circumferential acting force, resulting in the winding circumference of the winding shaft 6 failing to reach a preset adjustment value, and further an effect of adjusting the magnitude of misalignment between the tabs 71 not being reached may be reduced; and on the other hand, the possibility that the adjustment member 62 is detached from the winding shaft body 61 by being subjected to a large circumferential acting force, causing the two to separate may be reduced.

In some examples, the accommodating portion 61*b* extends from one end to the other end of the winding shaft body 61 in the axial direction V. The accommodating portion 61*b* may not penetrate an end surface of the winding shaft body 61. Illustratively, one adjustment member 62 is provided with one accommodating portion 61*b*. The adjustment member 62 is an adjustment block of an integral structure. A shape of the adjustment member 62 matches a shape of the accommodating portion 61*b*.

In some embodiments, the winding shaft 6 further includes a guide rail 65. The guide rail 65 is arranged at the accommodating portion 61*b*. The guide rail 65 extends in the axial direction V and intersects with the axial direction V. The adjustment member 62 is movably connected to the guide rail 65. The guide rail 65 extends in the axial direction V. The actuator 63 may drive the adjustment member 62 to move along the guide rail 65 when applying a driving force to the adjustment member 62 in the axial direction V. By connecting the winding shaft body 61 and the adjustment member 62 by means of the guide rail 65, it is conducive to improving stability of movement of the adjustment member 62, and the possibility that a momentary shock event occurs during the movement of the adjustment member 62, resulting in a deviation in the position of the adjustment member 62, or the possibility that the adjustment member 62 strikes the plate 7, resulting in a crack in the plate 7 may be reduced.

In some examples, the adjustment member 62 is in sliding connection to the guide rail 65. The guide rail 65 is a straight slide rail.

In some embodiments, the accommodating portion 61b includes an inclined surface 61c intersecting with the axial direction V. The adjustment member 62 is arranged at the inclined surface 61c. When the actuator 63 applies a driving force to the adjustment member 62 in the axial direction V to drive the adjustment member 62 to move, the adjustment member 62 may move relative to the inclined surface 61c.

In some examples, at least part of a surface of the adjustment member 62 facing the inclined surface 61c makes direct contact with the inclined surface 61c, such that the surface of the adjustment member 62 facing the inclined surface 61c is in sliding engagement with the inclined surface 61c. The inclined surface 61c and the surface of the adjustment member 62 facing the inclined surface 61c may be smooth surfaces with less roughness, so as to reduce frictional resistance between the two.

In other examples, a guide rail 65 is arranged on the inclined surface 61c, and the adjustment member 62 is movably connected to the guide rail 65, so as to reduce the difficulty of machining the adjustment member 62 and the inclined surface 61c.

In some embodiments, the actuator 63 is movably connected to the winding shaft body 61 in the axial direction V. In the axial direction V, the actuator 63 is connected to one end of the adjustment member 62. The actuator 63 is configured to apply a driving force to the adjustment member 62 in the axial direction V. In the embodiment, the actuator 63 and the adjustment member 62 are arranged side by side in the axial direction V. When the actuator 63 moves in the axial direction V, the adjustment member 62 may be driven to move in the axial direction V and the radial direction, thereby eliminating the need for additional structural members to apply an acting force to the adjustment member 62 in the radial direction, so as to reduce the number of parts and improve the compactness of the structure of the winding shaft 6.

In some examples, an end of the actuator 63 close to the adjustment member 62 abuts against an end surface of the adjustment member 62 facing the actuator 63. When the adjustment member 62 moves in the axial direction V and the radial direction, the end surface of the adjustment member 62 always makes contact with the actuator 63, and the adjustment member 62 moves relative to the actuator 63.

In some examples, the guide rail 65 or the inclined surface 61c is arranged inclined to the actuator 63.

In some examples, the winding shaft body 61 includes a threaded hole extending in the axial direction V. The threaded hole is in communication with the accommodating portion 61b and penetrates the end surface of the winding shaft body 61. The actuator 63 is in threaded connection to the threaded hole. When rotating the actuator 63, the actuator 63 may be fed in the axial direction V. By adjusting the size of a pitch of the threaded hole, the amount of feed of the actuator 63 during a turn of the actuator 63 may be adjusted, so as to adjust the amount of displacement of the adjustment member 62 extending out of or retracting into the accommodating portion 61b, which is conducive to improving the accuracy of adjustment of the winding circumference of the winding shaft 6.

In some embodiments, the winding shaft 6 further includes an elastic member 64. The elastic member 64 is used for connecting the winding shaft body 61 and the adjustment member 62. The elastic member 64 is configured to be compressed or stretched to apply an acting force to the adjustment member 62 in the axial direction V and/or the radial direction. Under an elastic restoring force of the elastic member 64, the adjustment member 62 may remain in contact with the actuator 63 at all times, which is conducive to ensuring immediacy of power transmission to the adjustment member 62 by the actuator 63, and the possibility that the actuator 63 fails to instantaneously transmit the driving force to the adjustment member 62 when moving in the axial direction V, resulting in an error in the amount of movement of the adjustment member 62 is reduced, such that the possibility that the amount of movement of the actuator 63 reaches the preset amount and the amount of movement of the adjustment member 62 does not reach the preset amount, and then the winding circumference of the winding shaft 6 is not adjusted to a preset value, resulting in the magnitude of misalignment between the tabs 71 being not adjusted or an adjustment value not reaching the preset value is reduced.

In some examples, the adjustment member 62 includes a first end 621 and a second end 622 that are opposite each other in the axial direction V of the winding shaft 6. At least part of the elastic member 64 is located between the first end 621 and the winding shaft body 61 in the axial direction V of the winding shaft 6. The actuator 63 is connected to the second end 622. The adjustment member 62 compresses or releases the elastic member 64 when moving. The elastic member 64 is configured to apply an acting force to the adjustment member 62 in the axial direction V when the adjustment member 62 moves. When the actuator 63 rotates clockwise to move relative to the winding shaft body 61 to push the adjustment member 62 away from an end surface, where the actuator 63 is arranged, of the winding shaft body 61, the adjustment member 62 compresses the elastic member 64 to make the elastic member 64 accumulate elastic potential energy. When the actuator 63 rotates anticlockwise to move relative to the winding shaft body 61 to move the adjustment member 62 close to the end surface, where the actuator 63 is arranged, of the winding shaft body 61, the adjustment member 62 releases the elastic member 64, and the elastic member 64 releases the elastic potential energy to push the adjustment member 62 to move. Illustratively, with reference to the position shown in FIG. 6, when the actuator 63 is fed to the left to push the adjustment member 62 to move to the left, the adjustment member 62 compresses the elastic member 64 to make the elastic member 64 accumulate elastic potential energy. When the actuator 63 is fed to the right, the elastic member 64 releases the elastic potential energy to push the adjustment member 62 to move to the right.

In some examples, the adjustment member 62 includes a first end 621 and a second end 622 that are opposite each other. At least part of the elastic member 64 is located between the second end 622 and the winding shaft body 61 in the axial direction V of the winding shaft 6. The actuator 63 is connected to the second end 622. The adjustment member 62 stretches or releases the elastic member 64 when moving. The elastic member 64 is configured to apply an acting force to the adjustment member 62 in the axial direction V of the winding shaft 6 when the adjustment member 62 moves. When the actuator 63 rotates clockwise to move relative to the winding shaft body 61 to push the adjustment member 62 away from an end surface, where the actuator 63 is arranged, of the winding shaft body 61, the adjustment member 62 stretches the elastic member 64 to make the elastic member 64 accumulate elastic potential energy. When the actuator 63 rotates anticlockwise to move relative to the winding shaft body 61 to move the adjustment member 62 close to the end surface, where the actuator 63 is arranged, of the winding shaft body 61, the adjustment member 62 releases the elastic member 64, and the elastic member 64 releases the elastic potential energy to push the adjustment member 62 to move.

Figure 8:
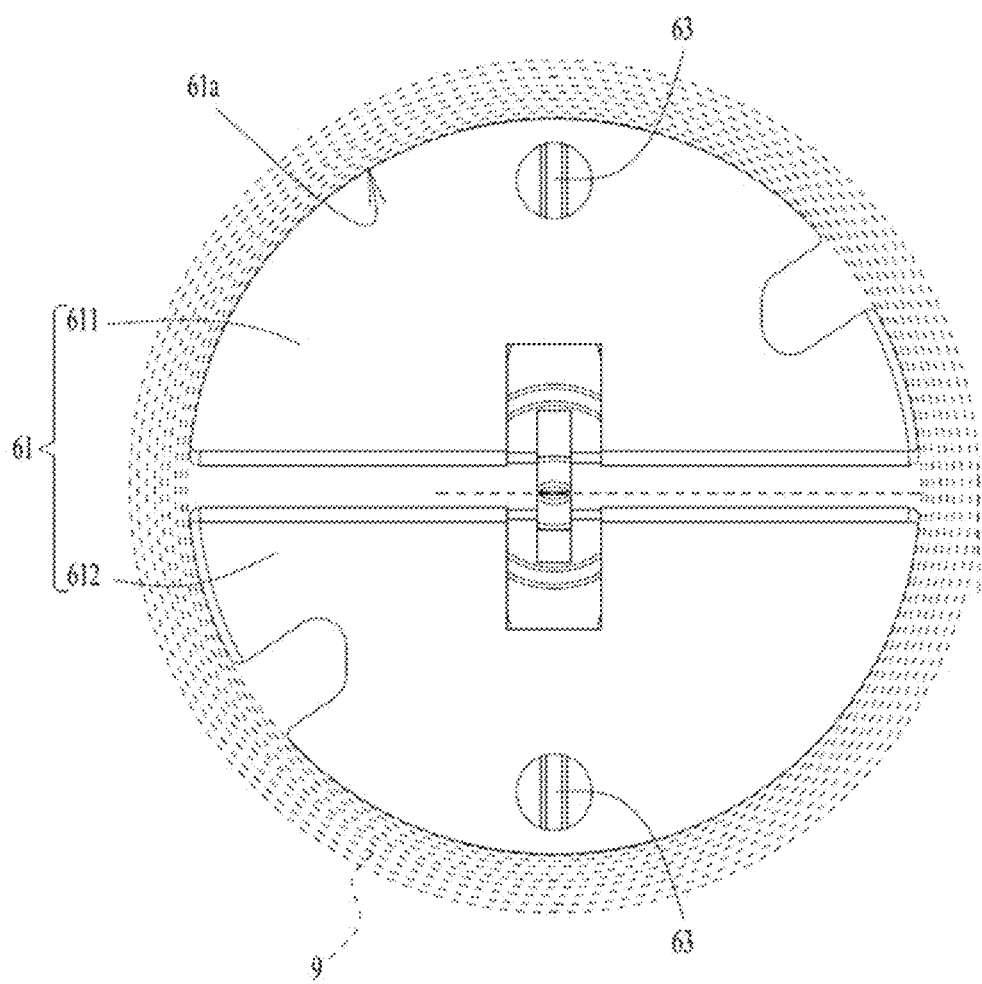
FIG. 8 is a schematic diagram of the winding shaft winding a cell according to the embodiment as shown in FIG. 5.
Figure 9:
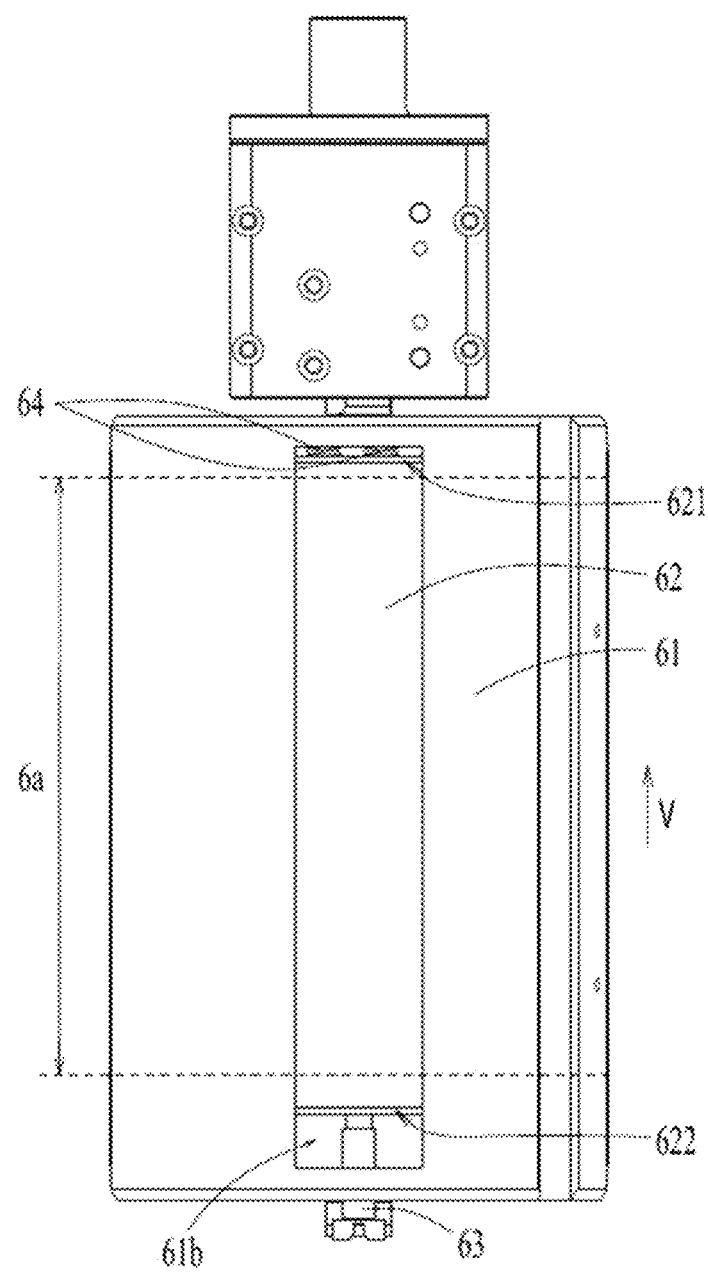
FIG. 9 is a schematic structural top view of the winding shaft according to the embodiment as shown in FIG. 5.
Figure 10:
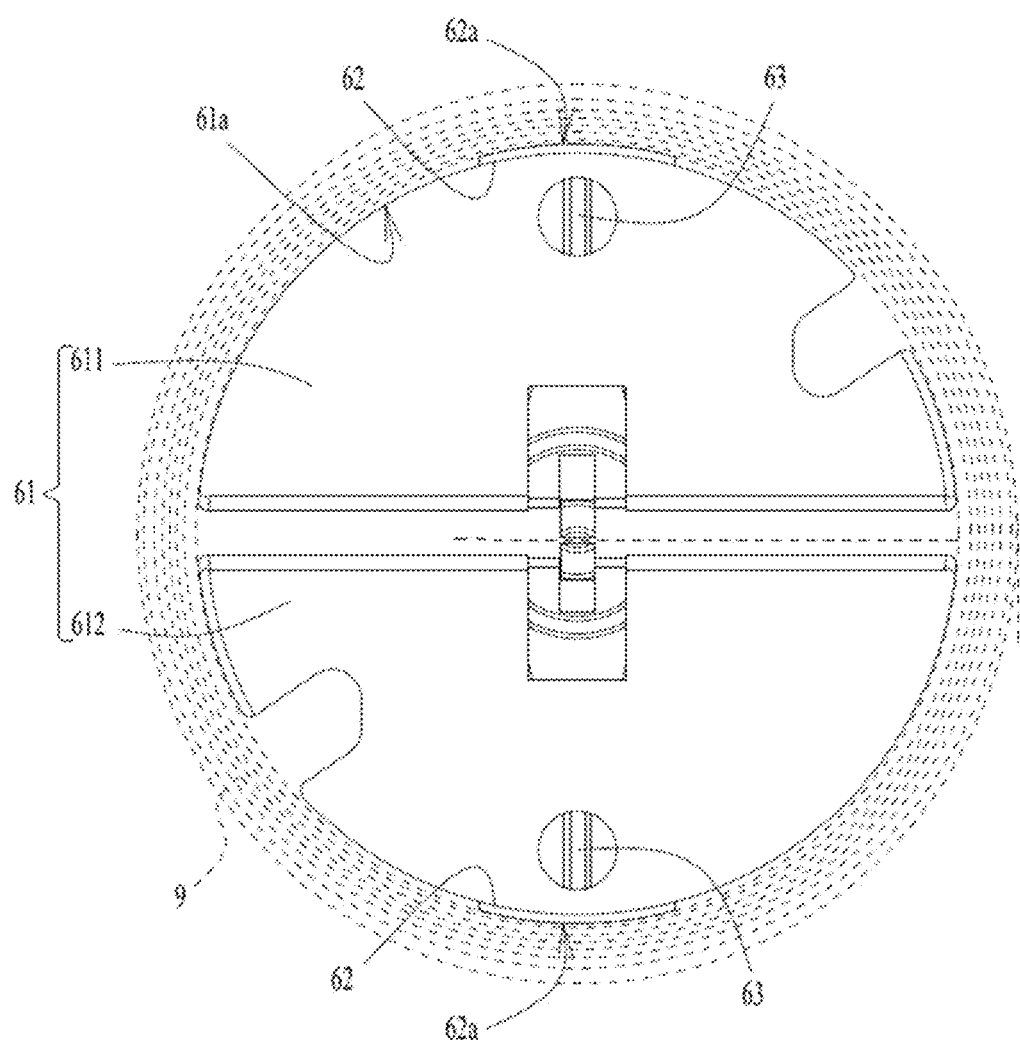
FIG. 10 is a schematic diagram of the winding shaft winding a cell according to the embodiment as shown in FIG. 9.

In some embodiments, with reference to FIG. 8, the adjustment member 62 is located in the accommodating portion 61b. An edge of the first winding surface 61a and an edge of the second winding surface 62a are flush with each other. The winding circumference of the winding shaft 6 has a minimum value. With reference to FIGS. 9 and 10, when the adjustment member 62 moves in the axial direction V and the radial direction, a part of the adjustment member 62 protrudes out of the winding shaft body 61, which increases the winding circumference of the winding shaft 6. The edge of the second winding surface 62a is higher than the edge of the first winding surface 61a.

Figure 11:
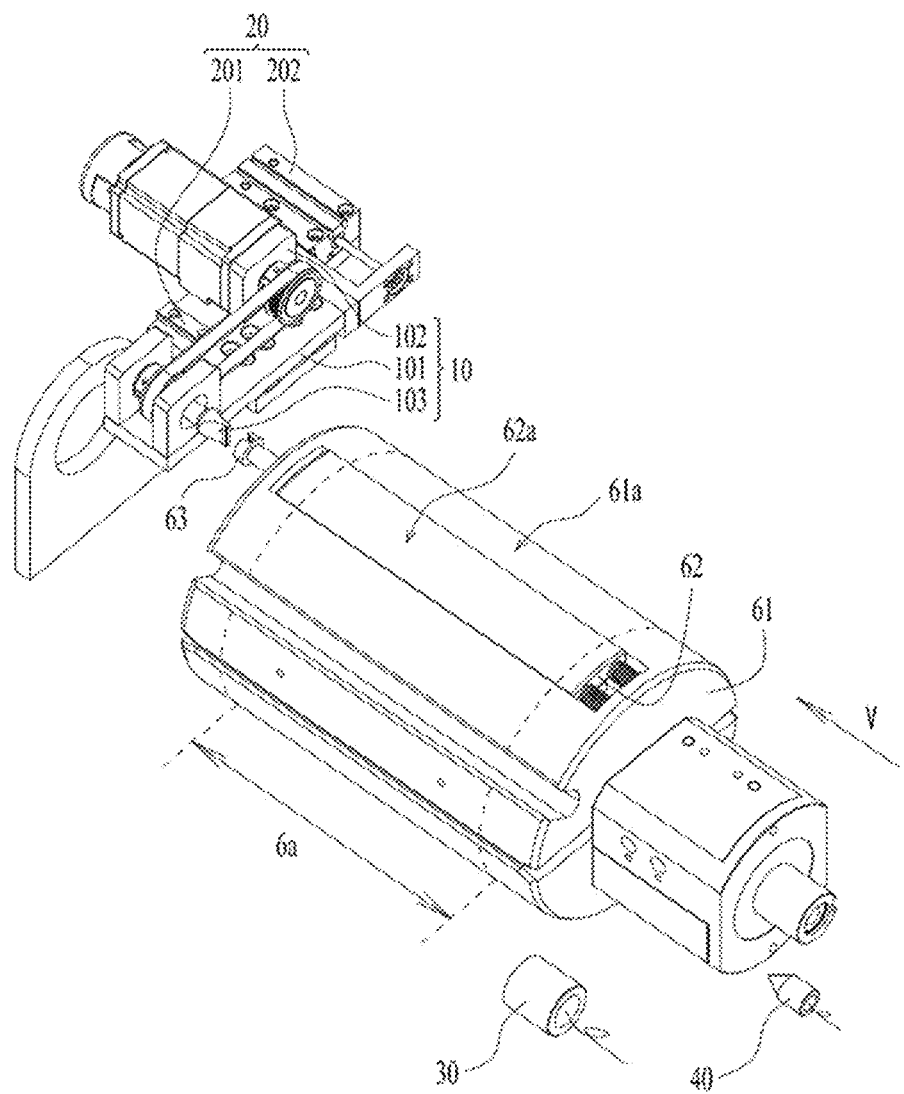
FIG. 11 is a schematic structural diagram of a partial structure of a cell manufacturing apparatus according to an embodiment of the present application.

With reference to FIG. 11, an embodiment of the present application further provides a cell manufacturing apparatus 1, including the winding shaft 6 of the above embodiments and a driving device 10. The driving device 10 is configured to drive the adjustment member 62 to move simultaneously in the axial direction V and the radial direction.

The driving device 10 and the winding shaft 6 may be provided independently. When the winding circumference of the winding shaft 6 needs to be adjusted, the driving device 10 moves to the winding shaft 6 and applies a driving force to the adjustment member 62 to move the adjustment member 62 in the axial direction V and the radial direction.

In some embodiments, the driving device 10 includes a base 101, a driver 102, and an adapter 103. The driver 102 and the adapter 103 are arranged on the base 101. The driver 102 drives the adjustment member 62 by means of the adapter 103. Output power of the driver 102 is transferred to the adjustment member 62 by means of the adapter 103. When the adapter 103 is damaged or needs to be serviced, the adapter 103 only needs to be disassembled, so as to reduce maintenance difficulty and maintenance costs.

In some examples, the winding shaft 6 includes an actuator 63. The actuator 63 is configured to drive the adjustment member 62 to move to change a relative position of the second winding surface 62a of the adjustment member 62 with respect to the first winding surface 61a of the winding shaft body 61, so as to change a winding circumference of the winding shaft 6. The winding shaft body 61 includes an accommodating portion 61b and a threaded hole extending in the axial direction V. The threaded hole is in communication with the accommodating portion 61b and penetrates the end surface of the winding shaft body 61. The actuator 63 is in threaded connection to the threaded hole. When rotating the actuator 63, the actuator 63 may be fed in the axial direction V. When the position of the adjustment member 62 is adjusted by means of the driving device 10, the driver 102 drives the adapter 103 to rotate. An end of the adapter 103 may be connected to the actuator 63, such that the actuator 63 may be screwed to rotate, to feed the actuator 63 in the axial direction V. The amount of feed of the actuator 63 is controlled by controlling the number of turns of rotations of the adapter 103, so as to control the amount of movement of the adjustment member 62 and ultimately to control the amount of adjustment of the winding circumference of the winding shaft 6. Illustratively, the adapter 103 is rotatably connected to base 101. Transmission between the adapter 103 and the driver 102 is implemented by a belt or a chain.

In some embodiments, the cell manufacturing apparatus 1 further includes a translation device 20. The translation device 20 includes a rail 201 and a deployment assembly 202. The base 101 is movably connected to the rail 201. The deployment assembly 202 is configured to drive the base 101 to move translationally along the rail 201 to cause the adapter 103 to move toward or away from the adjustment member 62. The translation device 20 may improve the smoothness of a movement process of the base 101.

In some examples, the base 101 is slidably connected to the rail 201. The rail 201 is a straight slide rail.

In some embodiments, the cell manufacturing apparatus 1 further includes a tab detection sensor 30 and a winding shaft angle gauge 40. The tab detection sensor 30 is arranged upstream of the winding shaft 6. The winding shaft angle gauge 40 is configured to obtain a corresponding rotation angle of the winding shaft 6 when the tab detection sensor 30 detects an entry of an $i^{th}$ tab 71 into the winding shaft 6, i being an integer greater than or equal to 1. The arrangement of the tab detection sensor 30 and the winding shaft angle gauge 40 is conducive to improving the accuracy of the rotation angle measurement of the winding shaft 6, so as to improve the accuracy of the winding circumference adjustment of the winding shaft 6.

In some examples, when the tab detection sensor 30 detects that the first tab 71 enters the winding shaft 6, the winding shaft angle gauge 40 obtains a corresponding rotation angle of the winding shaft 6 being 0°. When the second tab 71 enters the winding shaft 6, the winding shaft angle gauge 40 obtains a corresponding rotation angle of the winding shaft 6 being 360°. When the third tab 71 enters the winding shaft 6, the winding shaft angle gauge 40 obtains a corresponding rotation angle of the winding shaft 6 being 720°, and so on.

In some examples, the tab detection sensor 30 is a photoelectric sensor. The winding shaft angle gauge 40 includes an electronic angle sensor.

With reference to FIG. 12, an embodiment of the present application further provides a cell manufacturing method, including:

providing a winding shaft 6, where the winding shaft 6 includes a winding shaft body 61, an adjustment member 62 and an actuator 63, the winding shaft body 61 includes a first winding surface 61a, the adjustment member 62 is configured to be mounted on the winding shaft body 61 and movable simultaneously in an axial direction V of the winding shaft 6 and a radial direction of the winding shaft 6, the adjustment member 62 includes a second winding surface 62a, the first winding surface 61a and the second winding surface 62a are configured to wind plates 7 jointly, and the plates 7 include tabs 71; and obtaining an magnitude of misalignment between adjacent tabs 71 of i tabs 71 wound around the winding shaft 6, where i≥2;

sifting a maximum value from the magnitudes of misalignment, and compute a winding circumference adjustment amount of the winding shaft 6 according to the maximum value; and driving the adjustment member 62 to move by means of the actuator 63 according to the winding circumference adjustment amount, to change a relative position of the second winding surface 62a with respect to the first winding surface 61a, so as to adjust a winding circumference of the winding shaft 6.

According to the cell manufacturing method in the embodiment of the present application, by sifting a maximum value from the magnitudes of misalignment to adjust the winding circumference of the winding shaft 6, the difficulty of the winding circumference adjustment of the winding shaft 6 may be reduced, the number of winding circumference adjustment of the winding shaft 6 may be reduced, and the magnitude of misalignment between the tabs 71 may further be reduced. The cell manufacturing method in the embodiment of the present application may adjust the winding circumference of the winding shaft 6 during winding of the cell 9, so as to reduce the magnitude of misalignment between two adjacent tabs 71 in the wound cell 9.

In some embodiments, the winding shaft 6 in the above embodiments may carry out the cell manufacturing method in this embodiment.

In some embodiments, during winding of the cell 9, under the condition that misalignment occurs between adjacent tabs 71 in the it tab 71 wound around the winding shaft 6, the winding circumference of the winding shaft 6 is adjusted to reduce the magnitude of misalignment of the $(i+1)^{th}$ tab 71.

In some embodiments, the winding circumference adjustment amount $\Delta L$ is: $\Delta L = KX/Z$, where X is the maximum value, Z is the number of turns of a sheet wound around the winding shaft 6, K is a tab 71 misalignment adjustment factor, and $0.2 < K < 1$.

With reference to FIG. 13, an embodiment of the present application further provides a cell manufacturing method, including:

providing a winding shaft 6, where the winding shaft 6 includes a winding shaft body 61, an adjustment member 62 and an actuator 63, the winding shaft body 61 includes a first winding surface 61a, the adjustment member 62 is configured to be mounted on the winding shaft body 61 and movable simultaneously in an axial direction V of the winding shaft 6 and a radial direction of the winding shaft 6, the adjustment member 62 includes a second winding surface 62a, the first winding surface 61a and the second winding surface 62a are configured to wind plates 7 jointly, and the plates 7 include tabs 71; and obtaining a magnitude of misalignment between adjacent tabs 71 in an $n^{th}$ cell 9 wound around the winding shaft 6, where $n \geq 1$;

sifting a maximum value from the magnitudes of misalignment;

computing a winding circumference adjustment amount of the winding shaft 6 according to the maximum value; and driving the adjustment member 62 to move by means of the actuator 63 according to the winding circumference adjustment amount to change a relative position of the second winding surface 62a with respect to the first winding surface 61a, so as to adjust a winding circumference by which the winding shaft 6 winds an $(n+1)^{th}$ cell 9.

According to the cell manufacturing method in the embodiment of the present application, in the last cell 9, by sifting a maximum value from the magnitudes of misalignment to adjust the winding circumference of the winding shaft 6, the difficulty of the winding circumference adjustment of the winding shaft 6 may be reduced, the number of winding circumference adjustment of the winding shaft 6 may be reduced, and the magnitude of misalignment between the tabs 71 in the next cell 9 may further be reduced. The cell manufacturing method in the embodiment of the present application may adjust the winding circumference of the winding shaft 6 to reduce the magnitude of misalignment between two adjacent tabs 71 in the next cell 9 wound by the winding shaft 6 when the tabs 71 of the cell 9 wound around the winding shaft 6 are found to be misaligned.

In some embodiments, the winding shaft 6 in the above embodiments may carry out the cell manufacturing method in this embodiment.

In some embodiments, the winding circumference adjustment amount $\Delta L$ is: $\Delta L = KX/Z$, where X is the maximum value of the magnitudes of misalignment of the $n^{th}$ cell 9, Z is the number of turns of a sheet wound around the winding shaft 6, K is a tab 71 misalignment adjustment factor, and $0.2 < K < 1$.

While the present application has been described with reference to the preferred embodiments, various modifications can be made, and equivalents can be provided to substitute for the components thereof without departing from the scope of the present application. In particular, the technical features mentioned in the embodiments can be combined in any manner, as long as there is no structural conflict. The present application is not limited to the specific embodiments disclosed herein but includes all the technical solutions that fall within the scope of the claims.

What is claimed is:

1. A winding shaft, for winding plates and comprising:
    a winding shaft body comprising a first winding surface;
    an adjustment member configured to be mounted on the winding shaft body and movable simultaneously in an axial direction of the winding shaft and in a radial direction of the winding shaft, wherein the adjustment member comprises a second winding surface, and the first winding surface and the second winding surface are configured to wind the plates jointly, wherein the adjustment member comprises a first end and a second end that are opposite each other in the axial direction of the winding shaft;
    an actuator configured to drive the adjustment member to move to change a relative position of the second winding surface with respect to the first winding surface to change a winding circumference of the winding shaft; and
    an elastic member, wherein the elastic member is for connecting the winding shaft body and the adjustment member, and the elastic member is configured to be compressed or stretched to apply an acting force to the adjustment member in the axial direction of the winding shaft and/or the radial direction of the winding shaft; and, wherein
    in the axial direction of the winding shaft, at least part of the elastic member is located between the first end and the winding shaft body, the actuator is connected to the second end, the elastic member is compressed or released during movement of the adjustment member, and the elastic member is configured to apply an acting force to the adjustment member in the axial direction of the winding shaft during movement of the adjustment member; or
    in the axial direction of the winding shaft, at least part of the elastic member is located between the second end and the winding shaft body, the actuator is connected to the second end, the elastic member is stretched or released during movement of the adjustment member, and the elastic member is configured to apply an acting force to the adjustment member in the axial direction of the winding shaft during movement of the adjustment member.

2. The winding shaft according to claim 1, wherein the winding shaft body comprises an accommodating portion, the accommodating portion comprising an opening located in the first winding surface, at least part of the adjustment member being arranged in the accommodating portion through the opening, wherein the actuator is configured to drive the adjustment member to extend out of or retract into the accommodating portion.

3. The winding shaft according to claim 2, wherein the winding shaft further comprises a guide rail, the guide rail is arranged at the accommodating portion, the guide rail extends in an axial direction of the winding shaft and intersects with the axial direction of the winding shaft, and the adjustment member is movably connected to the guide rail.

4. The winding shaft according to claim 1, wherein the accommodating portion comprises an inclined surface intersecting with the axial direction of the winding shaft, and the adjustment member is arranged at the inclined surface.

5. The winding shaft according to claim 1, wherein the actuator is movably connected to the winding shaft body in the axial direction of the winding shaft, the actuator is connected to an end of the adjustment member in the axial direction of the winding shaft, and the actuator is configured to apply a driving force to the adjustment member in the axial direction of the winding shaft.

6. The winding shaft according to claim 1, wherein the winding shaft body comprises a first half shaft and a second half shaft, the first half shaft and the second half shaft are arranged side by side in the radial direction of the winding shaft, at least one said adjustment member is arranged at the first half shaft and/or at least one said adjustment member is arranged at the second half shaft.

7. A cell manufacturing apparatus, comprising:
the winding shaft according to claim 1; and
a driving device configured to drive the adjustment member by means of the actuator, to move the adjustment member simultaneously in the axial direction of the winding shaft and the radial direction of the winding shaft.

8. The cell manufacturing apparatus according to claim 7, wherein the driving device comprises a base, a driver and an adapter, the driver and the adapter are arranged on the base, and the driver drives the adjustment member by means of the adapter.

9. The cell manufacturing apparatus according to claim 8, further comprising a translation device, wherein the translation device comprises a rail and a deployment assembly, the base is movably connected to the rail, and the deployment assembly is configured to drive the base to move translationally along the rail so as to cause the adapter to move toward or away from the adjustment member.

10. The cell manufacturing apparatus according to claim 8, further comprising a tab detection sensor and a winding shaft angle gauge, wherein the tab detection sensor is arranged upstream of the winding shaft, and the winding shaft angle gauge is configured to obtain a corresponding rotation angle of the winding shaft when the tab detection sensor detects an entry of an $i^{th}$ tab into the winding shaft, i being an integer greater than or equal to 1.

11. A cell manufacturing method, comprising:
providing a winding shaft, wherein the winding shaft comprises a winding shaft body, an adjustment member and an actuator, the winding shaft body comprises a first winding surface, the adjustment member is configured to be mounted on the winding shaft body and movable simultaneously in an axial direction of the winding shaft and in a radial direction of the winding shaft, the adjustment member comprises a second winding surface, the first winding surface and the second winding surface are configured to wind plates jointly, and the plates comprise tabs; and obtaining a magnitude of misalignment between adjacent tabs of i tabs wound around the winding shaft, wherein i≥2;
obtaining a maximum value from the magnitudes of misalignment, and computing a winding circumference adjustment amount of the winding shaft according to the maximum value; and
driving the adjustment member to move by means of the actuator according to the winding circumference adjustment amount to change a relative position of the second winding surface with respect to the first winding surface, so as to adjust a winding circumference of the winding shaft; and, wherein
the winding shaft further comprises an elastic member, wherein
the elastic member is for connecting the winding shaft body and the adjustment member, and the elastic member is configured to be compressed or stretched to apply an acting force to the adjustment member in the axial direction of the winding shaft and/or the radial direction of the winding shaft, and
in the axial direction of the winding shaft, at least part of the elastic member is located between the first end and the winding shaft body, the actuator is connected to the second end, the elastic member is compressed or released during movement of the adjustment member, and the elastic member is configured to apply an acting force to the adjustment member in the axial direction of the winding shaft during movement of the adjustment member; or
in the axial direction of the winding shaft, at least part of the elastic member is located between the second end and the winding shaft body, the actuator is connected to the second end, the elastic member is stretched or released during movement of the adjustment member, and the elastic member is configured to apply an acting force to the adjustment member in the axial direction of the winding shaft during movement of the adjustment member.

12. The cell manufacturing method according to claim 11, wherein the winding circumference adjustment amount $\Delta L$ is: $\Delta L = KX/Z$, wherein X is the maximum value, Z is the number of turns of a sheet wound around the winding shaft, wherein K is a tab misalignment adjustment factor, and $0.2 < K < 1$.

13. A cell manufacturing method, comprising:
providing a winding shaft, wherein the winding shaft comprises a winding shaft body, an adjustment member and an actuator, the winding shaft body comprises a first winding surface, the adjustment member is configured to be mounted on the winding shaft body and movable simultaneously in an axial direction of the winding shaft and in a radial direction of the winding shaft, the adjustment member comprises a second winding surface, the first winding surface and the second winding surface are configured to wind plates jointly, and the plates comprise tabs; and obtaining a magnitude of misalignment between adjacent tabs in an $n^{th}$ cell wound around the winding shaft, wherein $n \geq 1$;

obtaining a maximum value from the magnitudes of misalignment;

computing a winding circumference adjustment amount of the winding shaft according to the maximum value; and driving the adjustment member to move by means of the actuator according to the winding circumference adjustment amount to change a relative position of the second winding surface with respect to the first winding surface, so as to adjust a winding circumference by which the winding shaft winds an $(n+1)^{th}$ cell; and, wherein the winding shaft further comprises an elastic member, wherein the elastic member is for connecting the winding shaft body and the adjustment member, and the elastic member is configured to be compressed or stretched to apply an acting force to the adjustment member in the axial direction of the winding shaft and/or the radial direction of the winding shaft, and in the axial direction of the winding shaft, at least part of the elastic member is located between the first end and the winding shaft body, the actuator is connected to the second end, the elastic member is compressed or released during movement of the adjustment member, and the elastic member is configured to apply an acting force to the adjustment member in the axial direction of the winding shaft during movement of the adjustment member; or in the axial direction of the winding shaft, at least part of the elastic member is located between the second end and the winding shaft body, the actuator is connected to the second end, the elastic member is stretched or released during movement of the adjustment member, and the elastic member is configured to apply an acting force to the adjustment member in the axial direction of the winding shaft during movement of the adjustment member.

14. The cell manufacturing method according to claim 13, wherein the winding circumference adjustment amount $\Delta L$ is: $\Delta L = KX/Z$, wherein X is the maximum value of the magnitudes of misalignment of the nth cell, Z is the number of turns of a sheet wound around the winding shaft, and K is a tab misalignment adjustment factor, $0.2 < K < 1$.

* * * * *